(12) United States Patent
Gosselin

(10) Patent No.: US 7,200,212 B2
(45) Date of Patent: *Apr. 3, 2007

(54) DECODING AND PROCESSING SYSTEM FOR ADVANCED DETERMINATION AND DISPLAY OF CITY AND STATE CALLER INFORMATION

(75) Inventor: Mark Gosselin, Kirkland, WA (US)

(73) Assignee: Cequint Inc, Seattle, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 10/751,822

(22) Filed: Jan. 5, 2004

(65) Prior Publication Data

US 2004/0141602 A1 Jul. 22, 2004

Related U.S. Application Data

(63) Continuation-in-part of application No. 10/225,549, filed on Aug. 20, 2002, now Pat. No. 6,985,572.

(51) Int. Cl.
*H04M 1/56* (2006.01)
*H04M 15/06* (2006.01)
*H04M 3/42* (2006.01)

(52) U.S. Cl. .............................. 379/142.1; 379/142.17; 455/415

(58) Field of Classification Search ........... 379/142.01, 379/142.04, 142.06, 142.1, 142.17, 201.01, 379/201.04, 207.02, 207.15; 455/415
See application file for complete search history.

(56) References Cited

U.S. PATENT DOCUMENTS

| | | | | |
|---|---|---|---|---|
| 6,075,850 A | * | 6/2000 | Ali et al. ................ | 379/142.01 |
| 6,353,664 B1 | * | 3/2002 | Cannon et al. .......... | 379/142.1 |
| 6,366,670 B1 | * | 4/2002 | Davis et al. ........... | 379/387.01 |
| 6,714,639 B1 | * | 3/2004 | Bedingfield et al. ... | 379/221.13 |
| 6,813,344 B1 | * | 11/2004 | Lemke .................. | 379/142.06 |
| 2001/0011015 A1 | * | 8/2001 | Shaffer et al. .............. | 455/414 |

* cited by examiner

Primary Examiner—Benny Quoc Tieu

(57) ABSTRACT

An improved decoding and processing system is provided for advanced determination and display of geographic information to a called party relating to the call origination party. The improved system comprises a receiving means to receive the calling number delivery (CND) message from a local central office (CO) switch or mobile station switching center; a microcontroller storage and retrieval device containing a data base library for selectively determining the corresponding geographic information such as city and/or state by matching the area code and/or local exchange number received from the call origination party; and a readout device for displaying the city and/or state of the incoming call. Preferably, the system includes capability to automatically update the data base library of the storage and retrieval device as new area codes and/or local exchanges are subsequently assigned. Accordingly, the improved system provides the user with convenient and efficient display of geographic information related to caller identification that is capable of determining an ever-increasing number of area code and local telephone exchange numbers.

5 Claims, 2 Drawing Sheets

DECODING AND PROCESSING SYSTEM FOR ADVANCED DETERMINATION AND DISPLAY OF CITY AND STATE CALLER INFORMATION

CROSS REFERENCE TO RELATED APPLICATION

This application is a continuation-in-part of my prior U.S. application Ser. No. 10/225,549, filed Aug. 20, 2002 now U.S. Pat. No. 6,985,572.

BACKGROUND OF THE INVENTION

The present invention relates generally to the science of telecommunications. In more detail, the present invention relates to a system for providing advanced geographic information to a called party about the calling party and/or call origination party.

Presently, telephone systems have evolved to include limited standard identification information about the calling phone (calling number and/or ANI) and the phone that was called (dialed number). This information is primarily obtained from the telephone number from which the phone call was placed and the telephone number that was dialed by the caller. The telephone system has recognized these two numbers as basic information sources (for routing calls and for billing purposes for example) and has developed a system of standards for the data character fields these numbers are to fill. The following background information will better explain these standards of limited phone identification used today by the telephone system of the United States and as it applies to the international standards as well.

Automatic Number Identification

Automatic Number Identification (ANI) is a basic element of telephone calls transported throughout the public and private telephone networks. For the North America Numbering Plan (NANP), it is currently 10 digits long. ANI is used extensively for: call routing, call billing, call tracking, and call identification.

Call Routing Based on ANI

Area Code Routing based on the calling phone number is a common feature found in most long distance telephone networks. Based on the calling party number (ANI) the call can be routed and/or receive special treatment by telephone switches, the phone network, and equipment. Some Interexchange Carriers (IXC's) (such as AT&T, MCI, Sprint, etc.) and Local Exchange Companies (LEC's) (such as Ameritech) provide many enhanced forms of call routing usually based on the first 3 or more ANI digit screening.

Call routing based on the first 3 ANI digits is usually referred to as Area Code Routing. For example, if the calling number ANI was 614/847-6161, then Area Code Routing would consider the "614" part of the ANI and route the Ohio originated call using the "614" as the broad geographic data element to start the routing routines and calculations, based on the routing rules and other factors (e.g., agents available, volume of calls, lines available, time of day, day of week, percent allocation, and other factors).

Call Routing based on more than the first 3 ANI digits allows for more geographic precision. Most ANI's have a geographic relationship. Bell Core publishes a LERG (Local Exchange Routing Guide) that gives the approximate longitude and latitude for the area code/exchange (as well as other data contained in the LERG) represented by the first 6 digits of the ANI. For example, for the calling number 614/847-6161 the "614-847" component has the geographic representation of Ohio and the metropolitan area of North Columbus/Worthington. The Area-Code-Exchange (NPA-NXX) Routing ability gives even greater routing definition for the calling party (ANI). If a caller to an 800 number with an ANI of "614/847-6161" was in need of being connected to a towing service, then the geographically closest towing service might be identified to handle the towing job (at a shorter travel time and possible lower cost).

Call Identification

One of the most wide spread and well-known uses of the caller's ANI is Caller ID (Caller Identification). The concept of Caller ID is to pass on to the recipient of the call the ANI of the caller before the call is answered. ANI has been a key component of ISDN (Integrated Services Digital Network) defined by the CCITT in the 1970's. The caller's ANI has traveled the phone network since the 1970's, if not earlier, in the form of two products:

1. 1-800 Access Type Service;
2. Integrated Services Digital Network (ISDN Service)

Many companies, business, and individuals use ISDN, digital access, and/or Call ID to get the data elements of the call—one of which is caller ANI.

The ANI of the caller is preserved and passed on as the call passes through the Public Telephone Network (and usually the Private Telephone Network, if possible). For example, the caller ANI may traverse through the LEC, IXC, CAP (Competitive Access Provider), PBX, ACD, Agent and so forth, so the final recipient receives the caller's ANI (i.e., caller ID).

Many conventional caller ID devices display the incoming phone number, but very few people are able to geographically recognize every area code. In this respect, reference is made to U.S. Pat. Nos. 6,009,149, 6,137,870, and 6,298,122, which disclosures are hereby incorporated by this reference. Moreover, most caller ID users would not inherently know more than a few of the local exchanges and their corresponding cities.

With an ever-increasing number of new area codes being used, those skilled in the art have recognized a significant need for an improved system for decoding and processing advanced determination and display of city and state caller information. The present invention fulfills these needs.

SUMMARY OF THE INVENTION

An improved decoding and processing system is provided for advanced determination and display of geographic information to a called party relating to the call origination party. The improved system comprises a receiving means to receive the calling number delivery (CND) message from a local central office (CO) switch or mobile station switching center; a microcontroller storage and retrieval device containing a data base library for selectively determining the corresponding geographic information such as city and state by matching the area code and/or local exchange number received from the call origination party; and a readout device for displaying the geographic information related to the incoming call. Preferably, the system includes capability to automatically update the data base library of the storage and retrieval device as new area codes and/or local exchanges are subsequently assigned. Accordingly, the improved system provides the user with convenient and efficient display of city and state caller identification that is capable of determining an ever-increasing number of area code and local telephone exchange numbers.

Since the city and state information will be quite large it will be of interest to store it as efficiently as possible. This will also satisfy the need for quick searched.

Preferably, the system includes means to update its database automatically, as new area codes and local exchanges are assigned. In such system having caller ID boxes with an off-hook circuit and dialing capability, the database device can be programmed to call into a server at a periodic rate for updates. The updated area code and related data is then transferred from server to the device using the Caller ID boxes' FSK decoder. In the case of mobile cellular phones, the updates may be accomplished in greater variety through SMS messaging, WAP link, or direction connection to a PC with a cable.

Accordingly, the improved system provides the user with convenient and efficient display of city and state caller identification that is capable of determining an ever-increasing number of area code and local telephone exchange numbers.

DESCRIPTION OF THE PREFERRED EMBODIMENTS

An improved decoding and processing system is provided for advanced determination and display of geographic information to a called party relating to the call origination party. The improved system comprises a receiving means to receive the calling number delivery (CND) message from a local central office (CO) switch or mobile station switching center; a microcontroller storage and retrieval device containing a data base library for selectively determining the corresponding geographic information such as city and/or state by matching the area code and/or local exchange number received from the call origination party; and a readout device for displaying the city and state of the incoming call. Preferably, the system includes capability to automatically update the data base library of the storage and retrieval device as new area codes and/or local exchanges are subsequently assigned. Accordingly, the improved system provides the user with convenient and efficient display of geographic information related to caller identification that is capable of determining an ever-increasing number of area code and local telephone exchange numbers.

Figure 1:
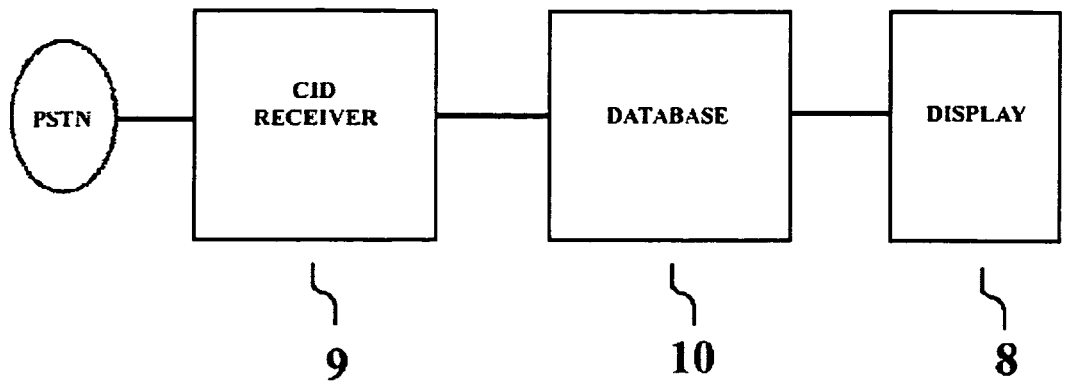
FIG. 1 is a schematic block diagram illustrating one embodied form of the present invention for advanced determination and display of geographic information relating to the call origination point for a land-line based system.

Referring now to the drawings, FIG. 1 depicts one embodied form of the invention. The caller identification receiving means 9 receives a MDMF or SDMF format message from the local central office switch containing the call origination phone number. A data base storage means 10, for instance a microcontroller, then finds the corresponding geographic information such as city and/or state by matching the area code and/or local exchange number received from the call origination signal. Storage means 10 may be provided with internal or external memory. The storage means will generally be FLASH, EEPROM, or other non-volatile memory device that is re-writable for updates. The signal derived from the storage means is thereafter transmitted to a readout device for displaying the city and state of the incoming call.

Figure 2:
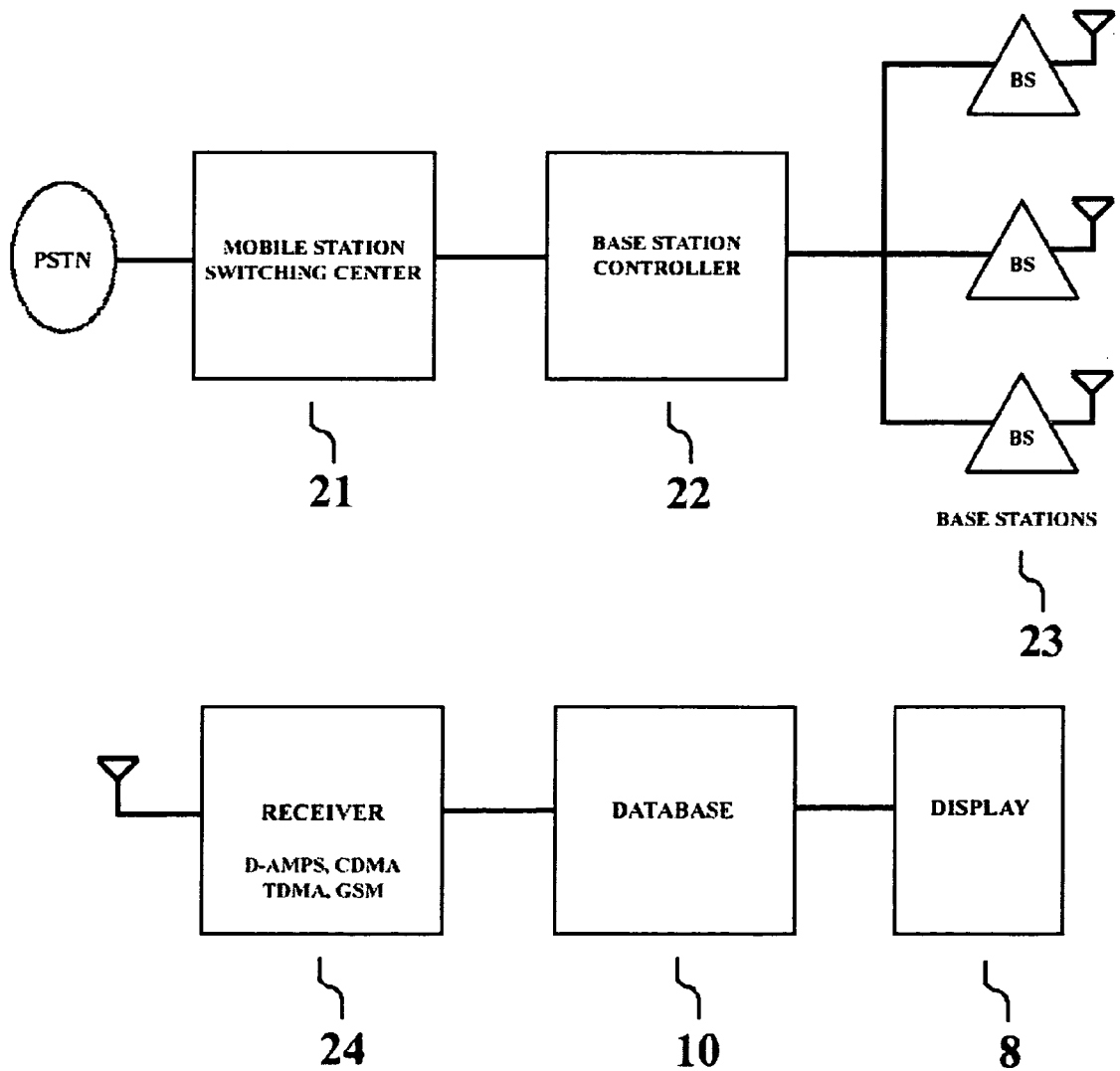
FIG. 2 is a schematic block diagram illustrating one embodied form of the inventive system for mobile cellular service.

In another embodiment, FIG. 2 depicts a system for mobile cellular service in which the CND data is sent over a wireless link to the device.

Referring now to FIG. 2, there is depicted a schematic block diagram of yet another embodiment of the present invention including a receiver for mobile cellular service. In this respect, the calling number delivery message is transmitted through a mobile station switching center 21 and thereafter transmitted to a base station controller 22. The message is thereafter transmitted to a plurality of base stations 23. The receiving device is a CDMA receiver for mobile cellular service and is decoded from the cellular data packet by a host microcontroller. A data base storage means 10, for instance a microcontroller then finds the corresponding geographic information by matching the area code and/or local exchange number received from the receiver 24 and transmits the output signal from the database to a display device 8 for displaying the geographic information of the incoming call.

In either embodiment the primary microcontroller may be linked directly to the database memory. Alternatively, when additional host microcontroller overhead cannot be tolerated, or for ease of integration, a database co-processor may be utilized. Further, the database co-processor and a serial FLASH memory may be combined together to form a complete custom single-chip solution integration into existing designs.

The North American Numbering Plan (NANP) has 680 area codes available for use. Of these, currently over 40 area codes are used for other countries that participate in the NANP. In order to directly address all 680 area codes in memory with their corresponding local exchanges it would require a storage device of over 128 MB. Numbering plans in foreign countries with more significant leading digits would have even greater storage requirements if directly addressed. Many different methods exist for efficient storage and compression of the data.

Since the microcontrollers generally used with Caller ID boxes are low-cost and therefore relatively slow, the City and States information is organized using a look-up table for fast searching.

| AREA CODE LOOK-UP TABLE | |
|---|---|
| Area Code (10-bits) | Memory Address (15-bits or greater, depending on memory size) |
| 000 | |
| 001 | |
| 206 | OB5h |
| 253 | OF8h |
| --- | |
| 999 | |

Area codes that are currently undetermined may be added to any memory location. Currently undefined codes are left blank.

Since the city and state information will be quite large it will be of interest to store it as efficiently as possible. The state name is stored only once at the beginning of each area code table along with its abbreviation. The city name is also stored only once followed by its associated exchanges. Since the exchanges are generally not assigned sequentially for a given city, all exchanges must be listed separately. The exchange code 000 is used to indicate an end of record since the exchange doesn't actually exist in the NANP.

| City, State, and Exchange Data as Organized in Memory: | |
|---|---|
| WA WASHINGTON | ; 70-bits (longest state name is Rhode Island ; 12 characters + 2 for abbreviation ; = 14 characters + 5-bits) |
| SEATTLE | ; 100-bits (20 characters for city name * 5-bits) |
| 201 | |
| 202 | |
| . | |
| . | |
| 998 | |
| 000 | |
| NORTH BEND | |
| 888 | |
| 000 | |

If the city and state information is not current, incoming call information may not match any of the entries in the memory. In the case of known area code but missing exchange, the state name will still be displayed. This also may be used for devices with smaller memories that don't include all of the minor exchanges.

Preferably the system includes means to update its database automatically, as new area codes and local exchanges will continue to be assigned. In this respect, devices having off-hook circuits or dialing capability, can be programmed to call into a server at a periodic rate for updates. The data is then transferred from server to the device using the Caller ID boxes' FSK decoder.

Figure 3:
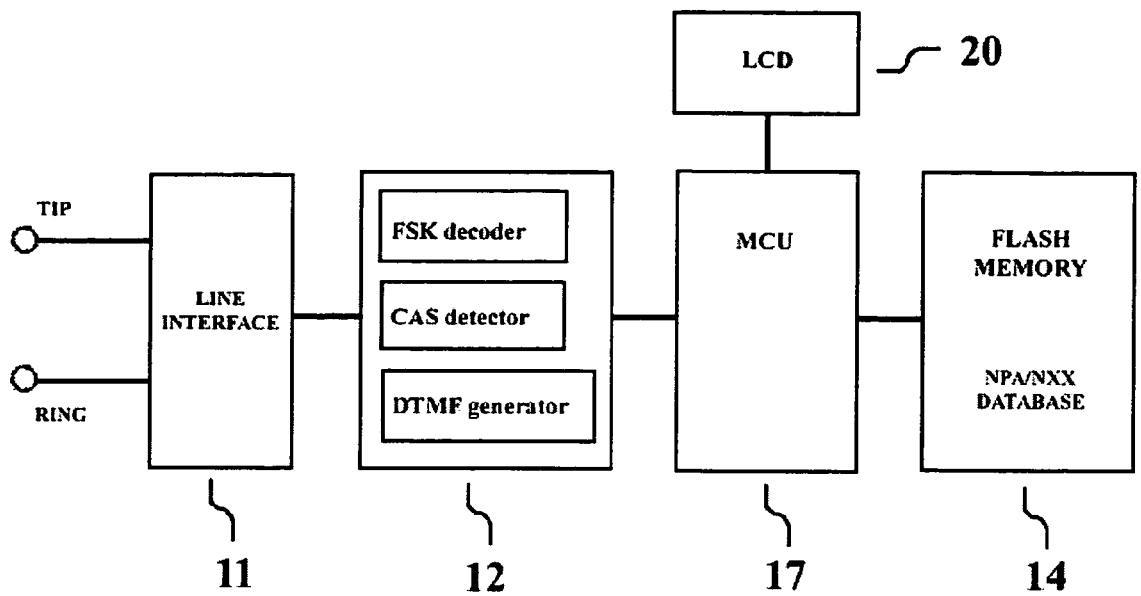
FIG. 3 is a schematic block diagram illustrating another embodied form of the present invention including a flash memory component for storage of geographic information for a land-line based system; nd

The following is an illustrative embodiment of the inventive system in FIG. 3.

In another embodiment, the CNM is transmitted to a line interface 11, and then to a receiving means 12. The receiving device 12 is a low power monolithic mixed signal CMOS integrated circuit for receiving physical layer FSK and CAS signals. For on-hook reception the device is alerted by a ring or presence of the channel seizure detected by the FSK decoder with the receiving means 12. For off-hook reception, Bellcore's call alerting signal (CAS) is detected by the integrated circuit. In either case the FSK signal is decoded by a microcontroller 17 and the NPA is obtained. The microcontroller 17 then compares the first three digits of the NPA to the look-up table in the city and state database memory 14. Once the memory address for the corresponding area code is found a match can be made to the NXX to read the city data. The city and state data are then displayed on the LCD 20 with the other standard name and number caller ID information.

Receiving updates may be conveniently provided in devices capable of off-hook reception. The device uses the built in DTMF dialer to call a central server which contains the current city and state data. The server initiates the transfer using a CAS signal, which is acknowledged by device with a DTMF tone. The server then sends any updated area codes and exchanges which the device receives using its FSK decoder. The microcontroller then updates the database in memory with the updated NPA/NXX information.

Figure 4:
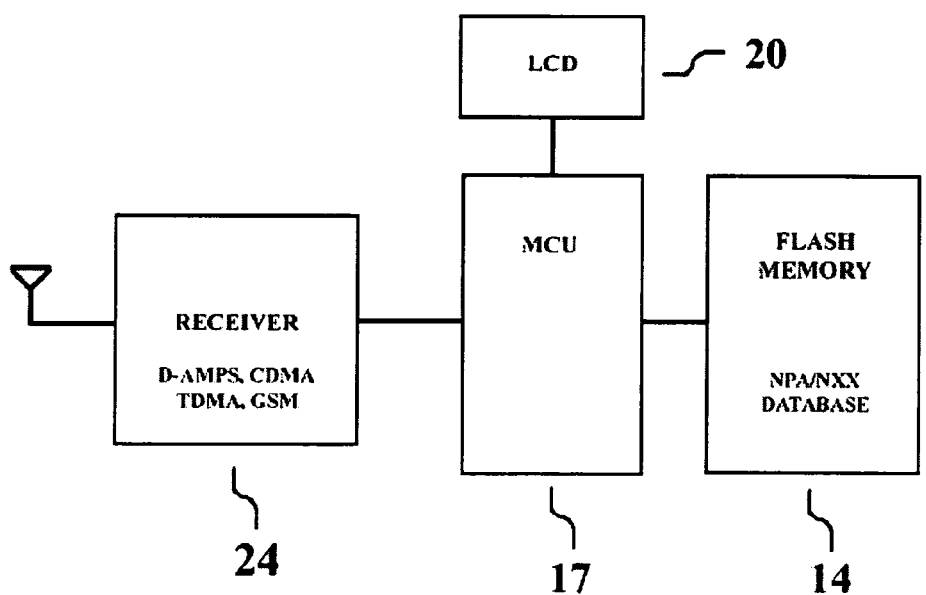
FIG. 4 is a schematic block diagram illustrating yet another embodiment having a flash memory storage means for a mobile cellular phone.

The following an illustrative embodiment of the inventive system in FIG. 4.

In another embodiment, the receiving device 24 is a CDMA receiver for mobile cellular service. The CND is received and decoded from the cellular data packet by the host microcontroller 17. The microcontroller 17 then compares the first three digits of the NPA to the look-up table in the city and state database memory 14. Once the memory address for the corresponding area code is found a match can be made to the NXX to read the city data. The city and state data are then displayed on the LCD 20 with the other standard name and number caller ID information. Cellular phones with full graphic displays may alternately or additionally display the geographic location information pictorially.

Updates to the database are received by SMS (Short Message Service). The carrier's server sends updated NPA/NXX information via SMS. The host microcontroller 17 writes to the database in FLASH memory with the updated NPA/NXX information.

Although the foregoing is illustrative of the NANP (North American Numbering Plan), those skilled in the art recognize that the inventive system may also be used with foreign numbering plans. In this respect foreign countries have equivalent identifier information that may be correlated geographically in the particular country.

For example, Mexico has recently completed a series of numbering plan changes which were supposedly implemented in stages. The first stage was to expand the local numbers to a standard 7 digits. Three cities—Mexico City, Guadalajara and Monterrey—with high telephone density already had 8 digit local numbers and were not subject to this local numbering change. It was also recommended in the plan change that the term local number be changed to subscriber number (SN). It appears that the original local numbers, with some exceptions, were 5 digits in length. To make the change easier for consumers, the two extra digits were taken from the last digits of the existing area code and attached to the beginning of the local number. This made the area code only a single digit for an interim period.

Subsequent to the local number change, the national number was expanded from 8 to 10 digits. The national number is comprised of the country code (52), regional identification number (RIN) and the local number. The RIN is also referred to as the area code, but it has been recommended that it now be termed the national destination code (NDC).

Under this numbering plan change, which by all claims became effective in November 2001, each local service area was assigned a new regional identification number (i.e., 3-digit area code). Again, Mexico City, Guadalajara and Monterrey were the exceptions because of their existing 8-digit local numbers and were assigned two-digit area codes. Several sites have lists of the new RINs for at least the top 100 cities.

In recent years, Australia has also phased in number plan changes to achieve standardization and allow for expansion. Local numbers were standardized to 8 digits. Interestingly enough, the 54 area codes in place prior to the numbering plan changes have been reduced to a mere four area codes—02, 03, 08 and 07. Additionally, all mobile phone numbers, regardless of network, have an area code of 04. Here too, it looks like the old area codes were used to expand the local number by attaching them to the front of the existing local number.

The UK's National Numbering Scheme is a list of all their telephone numbers that are allocated, free, protected, reserved or not designated. The scheme provides the framework for the numbering plan and includes the United Kingdom's Specified Numbering Scheme (SNS) managed by Oftel. However, Oftel does not control all telephone numbers. There are Short Codes, for example, which are memorable 3- to 6-digit numbers not governed by Oftel, that provide access to telephony services for end users.

The National Significant Number (NSN) is part of the UK's numbering scheme. The NSN consists of the Geographic Area Code (formerly the National Destination Code) and the Subscriber Number. The UK is working to make 10-digit NSNs (not including the national code of '01') the standard. This would consist of 3-digit area codes followed by 7-digit subscriber numbers, or 4-digit codes followed by 6-digit numbers. In the meantime, area codes today can range from 3–6 digits and subscriber numbers from 3–7 digits.

The area codes in Japan can be 1 to 5 digits in length. The subscriber number (i.e., local exchange number+subscriber number) can then be 4 to 8 digits in length. The trunk prefix for Japan is also '0'. Japan's National Significant Number is represented a 'OABCDEFGHIJK', so the phone number length, like the UK, will not exceed 11 digits. Phone numbers cannot start with '1'. Mobile phone numbers have a separate prefix from fixed lines.

Accordingly, the improved system provides the user with convenient and efficient display of geographic information related to caller identification that is capable of determining an ever-increasing number of area code and local telephone exchange numbers.

I claim:

1. An improved decoding and processing system for advanced determination and display of geographic caller information, of a call origination party said system comprising:
   receiving means to receive a CND message from a mobile station switching center containing call identification data;
   storage and retrieval means containing a data base library for selectively determining the corresponding geographic caller information by decoding the CND message and correlating the decoded message with the data base library to determine the geographic caller information of the caller origination party;
   wherein said storage and retrieval means includes capability to automatically update the data base library of the storage and retrieval means using a wireless packet data network as new area codes and/or local exchanges are subsequently assigned; and
   a readout device for displaying the geographic information of the incoming call.

2. The improved system of claim 1 wherein the call geographic information is a city identification of the call origination party.

3. The improved system of claim 1 wherein the call geographic information is a state identification of the call origination party.

4. The improved system of claim 1 wherein the call geographic information is displayed pictorially.

5. The improved system of claim 1, wherein the capability to automatically update the data base library of the storage and retrieval means uses Wireless Application Protocol (WAP) over the wireless packet data network.

* * * * *